United States Patent [19]

Olsen

[11] 3,945,457

[45] Mar. 23, 1976

[54] HYDRAULIC STEERING APPARATUS

[75] Inventor: Carl Ivar Olsen, Sonderborg, Denmark

[73] Assignee: Danfoss A/S, Nordborg, Denmark

[22] Filed: Jan. 13, 1975

[21] Appl. No.: 540,552

Related U.S. Application Data

[62] Division of Ser. No. 416,179, Nov. 15, 1973.

[52] U.S. Cl. .................. 180/79.2 R; 60/468; 91/400
[51] Int. Cl.² ........................................... B62D 5/06
[58] Field of Search ................. 180/79.2 R, 79.2 B; 91/449, 451, 400; 60/468, 494

[56] References Cited
UNITED STATES PATENTS

| | | | |
|---|---|---|---|
| 2,728,193 | 12/1955 | Bacchi | 91/400 X |
| 2,810,930 | 10/1957 | Macdonald | 91/400 X |
| 2,827,976 | 3/1958 | Brand | 180/79.2 R |
| 3,566,749 | 3/1971 | Allen | 180/79.2 B |

*Primary Examiner*—M. H. Wood, Jr.
*Assistant Examiner*—John A. Pekar

[57] ABSTRACT

A hydraulic steering apparatus comprising a sump, a pair of motors controlling the vehicle parts to be steered, a steering wheel operated control device for controlling the motors, a continuously operable pump between the sump and control device, a pair of control conduits connected to the control device and meeting at a junction, a pair of stroke limiting control valves in the control conduits alternately actuable by the two motors, and an exhaust conduit from the junction to the sump. A short circuiting path shunting the pump, a pressure operated switching valve in the sort circuiting path, a pressure operated pilot valve for controlling the switching valve, a spur connection between the pilot valve and the exhaust conduit downstream from the spur connection to cause concomitant opening the pilot valve and the switching valve.

2 Claims, 4 Drawing Figures

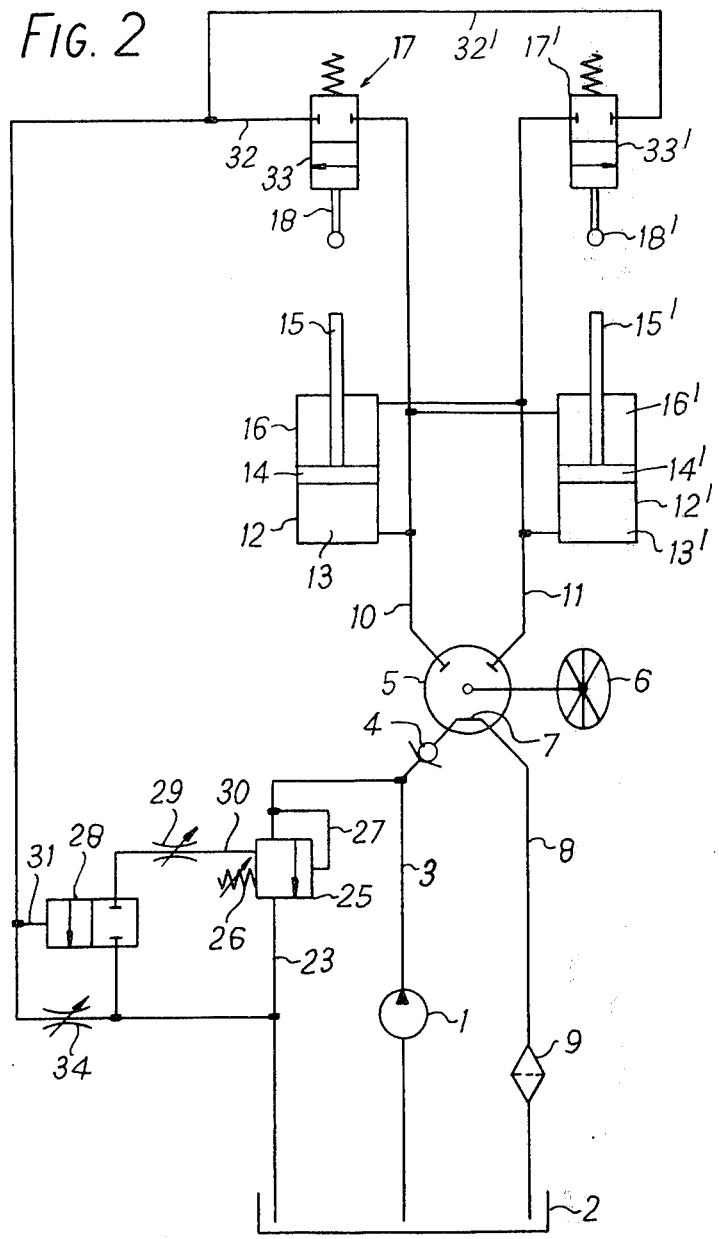

HYDRAULIC STEERING APPARATUS

This is a Divisional application of Ser. No. 416,179 filed Nov. 15, 1973.

The invention relates to a hydraulic steering apparatus comprising a continuously operative pump, an operating motor for adjusting the parts to be steered, a control device which is adjustable by the steering wheel and which, in its neutral position, connects the pump to the tank through a short-circuiting path and, in its two operating positions, connects the pump to one side of the operating motor and connects the other side of the operating motor to the tank, and a tank, the control device comprising in particular a control element connected to a steering wheel and a following element connected to a metering motor which are relatively displaceable to a limited extent.

Such steering apparatuses are for example known from British Specification No. 897,768. The control device can comprise an inner rotary slide connected to the steering wheel and an outer rotary slide connected to the metering motor determining the quantity of pressure medium flowing to the operating motor. The two rotary slide sleeves together form a reversing valve held by springs in a neutral position in which control apertures in the slides open a short-circuiting path between the pressure side and relief side. Upon relative rotation in one or the other direction, this short-circuiting path is closed to provide communication to control orifices which allow the pressure medium to flow from the pump through the metering motor to the one side of the operating motor and from the other side thereof back to the tank, or conversely.

Further, it is known from German Pat. No. 1,124,776 to provide limit switch devices for a hydraulic operating motor. These devices are intended to prevent machine pulse, tools or the like which are movable by the hydraulic motor from being pressed against a mechanical limiting abutment or subjected to other damage. The limit switch devices are provided with stop valves included in the two conduits connecting the motor to a reversing switch for controlling same.

In a hydraulic steering apparatus of the aforementioned kind, the object of the invention is to prevent the parts moved by the operating motor from striking mechanical abutments without giving rise to faults in the hydraulic circuit.

According to the invention, this object is fulfilled in that, in a manner known per se, the end position of the operating motor is associated with a limit switch device and that a short-circuiting path between the primary side of the control device and the tank is provided with a switching valve which opens on actuation of the limit switch device.

Although limit switch devices are used in this construction for stopping the operating motor, they are not in the form of stop valves but open a short-circuiting path between the pump and tank. The pressure at the motor will thereby generally not drop to zero but it is sufficiently small to prevent further movement of the operating motor and the parts to be steered or at least ensure that these parts come to lie gently against the limiting stop. As a result, the full pressure forces obtain in the hydraulic circuit only during actual movement of the operating motor whereas during standstill there is a much lower pressure either as a result of the short-circuiting path in the control device in the neutral position or as a result of the switching valve when reaching the end position. The pump output is correspondingly low. In contrast with the case where a limit switch device with stop valve is used, there is no danger that the pump will build up a pressure which has to be reduced with the aid of an over-pressure valve and would lead to undesirable heating of the pressure fluid. In addition, the maximum pump output will then be available for other uses.

A person steering a vehicle is used to moving parts striking a mechanical abutment at the end of the steering range. Such impact does not occur when using the limit switch device. Nevertheless, the driver still obtains the feeling of 'impact'. When the end position is reached and the pressure fluid bypasses the operating motor through the short-circuiting path, pressure fluid will no longer flow through the metering motor. However, if the following element connected to the metering motor remains stationary, the control element connected to the steering wheel can also no longer turn.

In a preferred embodiment the switching valve is part of the limit switch device. This results in a very simple construction. The sensing element of the limit switch device can actuate the switching valve directly or via a coupling.

In a further embodiment of the invention, it is recommended that the open condition of the short-circuiting path is also controlled in dependence on the fact that pressure occurs on the first side of the operating motor serving for the supply upon movement towards the limit switch device. If this pressure, which may be very small, is relieved because the control device is moved in the sense of movement in the opposite direction of the operating motor, the short-circuiting path will close immediately, with the result that the operating motor will start to move without delay in the opposite direction. This ensures in a simple way that the short-circuiting path will not remain permanently open when the sensing element of the limit switch device has been moved by the operating motor or a part connected thereto.

A very simple construction is obtained if a pressure responsive additional valve of which the control connection is connected to the first side of the operating motor is provided in series with the switching valve. No special provisions need then be made in the limit switch device.

It is also favourable for the limit switch device to comprise a control valve disposed in a control conduit which leads from the first side of the operating motor to a control input of the switching valve. This control conduit is influenced by the limit switch device on the one hand and on the other hand by pressure on the first side of the operating motor. However, it is particularly advantageous that one can make do with a comparatively thin control conduit. In this way one saves tubing for the entire short-circuited quantity leading from the primary side of the control device through the limit switch device to the tank, which would be a very expensive conduit system if there is a large spacing between the control device and the operating motor. With such a construction, standard structural components may be used for the limit switch device and switching valve.

In hydraulic steering apparatus with an over-pressure valve between the pump output and tank, the over-pressure valve may have a further control input and simultaneously serve as switching valve. This over-pressure valve will then serve the usual function of limiting the maximum pressure of the pump and also the function of the switching valve.

It is particularly recommendable for the switching valve to be a pressure control valve controlled by a pilot valve and for the control input to be connectible to the tank by a pilot valve. In this case the connection of the pressure actuating element of the pilot valve can be connected to the tank through a throttle valve. This throttle valve is set by hand so that when the control valve is open a small leakage current will always flow from the limit switch device to the tank. In view of this leakage current, the steering wheel must slowly be turned further to maintain the end position of the operating motor. However, upon reversal of movement of the steering wheel, the pilot valve and thus the switching valve can close very rapidly so that pressure build-up on the second side of the operating motor takes place quickly.

In another embodiment of the invention, provision is made for the limit switch device to comprise an electric limit switch, a pressure controlled switch is connected to the first side of the operating motor, and both switches are in series with one another and with electromagnetic apparatus for actuating the switching valve. In this way the double dependence of actuation of the limit switch device and the pressure on the first side of the operating motor is likewise ensured. Preferably, the electromagnetic apparatus controls a pilot valve which, in turn, controls an over-pressure valve serving as a switching valve.

The invention will now be described with reference to the examples of the drawings, wherein:

FIG. 2 is a hydraulic circuit diagram for a second embodiment of the invention;

Figure 1:
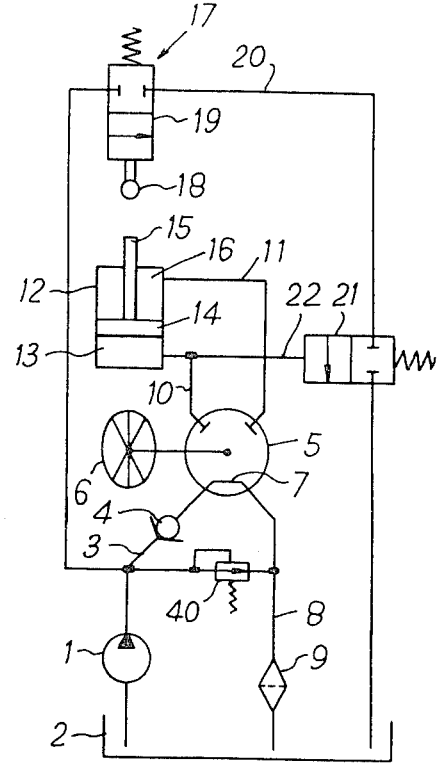
FIG. 1 is a hydraulic circuit diagram for a first embodiment of the invention.

In the FIG. 1 embodiment, a pump 1 supplies pressure fluid from a tank 2 through a pressure conduit 3 with check valve 4 to a control device 5 which can be set by a steering wheel 6. In the neutral position the pressure fluid returns to the tank 2 through a short-circuiting path 7 and an outflow conduit 8 having a filter 9.

Supply conduits 10 and 11 connect the control device 5 to an operating motor 12. If pressure fluid reaches the first side 13 of the operating motor, the piston 14 and the piston rod 15 will be pushed upwardly, whereby the second side 16 of the operating motor 12 becomes connected to the outflow conduit 8 through the conduit 11. Upon rotation of the steering wheel 6 in the opposite direction, the functions of the conduits 10 and 11 are interchanged so that the operating motor will reverse its direction of movement.

A limit switch device 17 having a sensing element 18 is associated with a moved component of the operating motor 12 or parts connected thereto, in the present case the piston rod 15 which adjusts the parts of the vehicle to be steered, and the rod 15 makes contact with the sensing element 18. Such contact opens a switching valve 19 contained in the limit switch device 17. This switching valve lies in a short-circuiting path 20 which connects the pressure conduit 3 to the tank 2. A pressure responsive additional valve 21 is in series with the switching valve 19. Its control input 22 is connected to the first side 13 of the operating motor 12. The additional valve 21 will only open when there is pressure in the supply conduit 10, no matter how small this pressure might be.

Now, when the operating motor 12 reaches its end position and the switching valve 19 opens, the pressure conditions having already caused the additional valve 21 to open, all the pressure medium conveyed by the pump 1 flows directly to the tank 2 through the short-circuiting path 20. Further displacement of the operating motor 12 with the aid of the power of the pump 1 is therefore impossible. When the steering wheel 6 is turned in the opposite direction and the pressure from the supply conduit 10 is thereby relieved, the short-circuiting path 20 is interrupted. The pressure occurring in the supply conduit 11 can then have its full valve so that the operating motor 12 will commence to run immediately and move out of the end position.

A similar arrangement is provided for the opposite end position, for example analogous to the representation of FIG. 2. To avoid damage of the pump 1 in the case of overloading of the operating motor 12, an over-pressure valve 4 is provided between the pressure conduit 3 and the outflow conduit 8.

In the hydraulic circuit according to FIG. 2, the same reference numerals as in FIG. 1 are used for similar parts. Provision is made for two operating motors 12 and 12' movable in opposite directions. The parts belonging to the operating motor 12' are designated by a prime. In this embodiment, a short-circuiting path 23 is provided and it includes a switching valve 25. The switching valve is an over-pressure valve actuated against the force of a spring 26 by pressure supplied on the pump pressure side through the passage 27. It is also formed as a pressure control valve controlled by means of a pilot valve 28, for which a passage 30 is provided. The pilot valve 28 has a control input 31 leading to a pressure actuating element. Connected to this pressure input 31 there are control conduits 32 or 32' which are connected to the pressure sides 13 or 13' of the operating motors 12 or 12' and each contain a control valve 33 or 33' which forms part of the limit switch device 18 or 18'. Further, the control input 31 is connected to the tank 2 through a throttle valve 34.

In operation, pressure fluid flows through the short-circuiting path 7 directly to the tank in the rest position. In one operating direction, pressure fluid flows through the supply conduit 10 to the first side 13 of the operating motor 12 and the second side 16' of the operating motor 12'. When the operating motor 12 reaches the end position and the piston rod 15 displaces the sensing element 18, the control valve 33 will open. A quantity of leakage oil will therefore flow from the supply conduit 10 through the throttle valve 34 into the tank. A pressure is set up at the control input 31 to open the pilot valve 28. The switching valve 25 will also open as a result and the predominant part of the pressure fluid delivered by the pump 1 will flow off through the short-circuiting path 23. The operating motors 12 and 12' can now no longer be moved with the aid of the power from the pump 1. If the steering wheel is moved in the opposite direction, the pressure on the first side 13 of the operating motor 12 is relieved and therefore also at the control input 31 by the control device 5. The pilot valve 28 and the switching valve 25 will close. During subsequent movement of the operating motors in the opposite direction the entire pressure will now be immediately available. The operating movement in this direction is terminated when the piston rod 15' meets the sensing element 18' of the limit switch device 17'. The manner of operation in this end position is the same as before.

Figure 4:
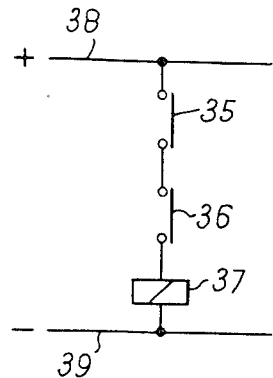
FIG. 4 is an electric circuit diagram for the FIG. 3 embodiment.
Figure 3:
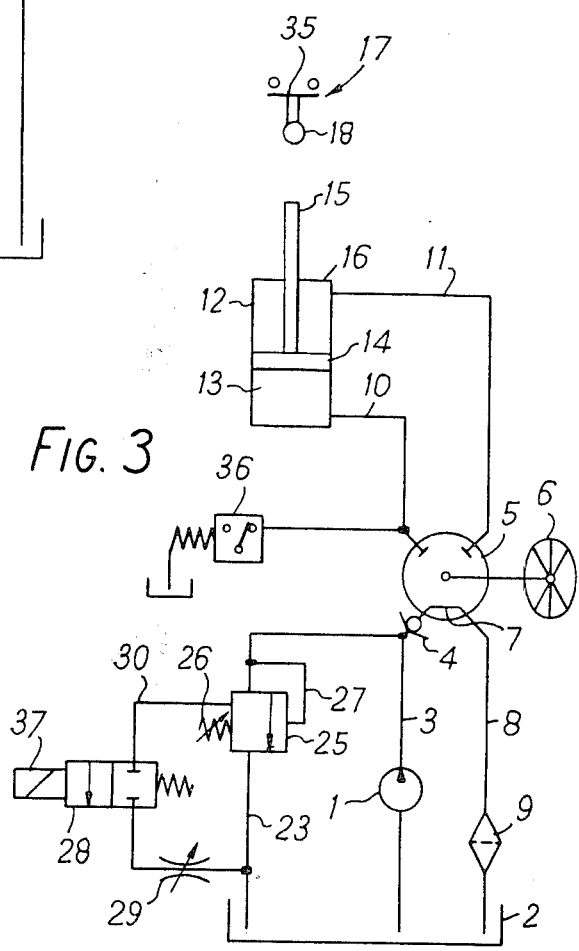
FIG. 3 is a hydraulic circuit diagram for a third embodiment of the invention.

In the hydraulic switch according to FIG. 3, similar integers are designated by the same reference numerals as in FIG. 1. The limit switch device 17 is provided with an electric contact 35. The supply conduit 10 is connected to a pressure responsive switch 36. The pilot valve 28 carries an electromagnetic actuating apparatus 37. The two switches 35 and 36 as well as the electromagnetic actuating apparatus 37 are, as shown in FIG. 4, placed in series between the two feed conduits 38 and 39 of an electric circuit.

If, upon actuation of the steering wheel 6, the piston rod 15 reaches the sensing element 18 of the limit switch device 17, whereby the supply conduit 10 will deliver pressure, the electric circuit to the actuating apparatus 37 is closed. The pilot valve 28 opens as in FIG. 2 and so will the switching valve 25.

I claim:

1. Hydraulic steering apparatus comprising a sump, two motors for controlling parts to be steered, said motors including movable motor elements, a steering wheel operated control device having supply and exhaust openings and selectively reversible control ports with each of said control ports alternating as a supply and exhaust port, said control ports each being oppositely connected to one side of one of said motors and to the other side of the other of said motors, a continuously operable pump between said sump and said control device supply opening, a pair of control conduits connected to said control ports and meeting at a junction, a pair of stroke limiting control valves in said control conduits actuatable alternately to open positions by said movable motor elements, and an exhaust conduit from said junction to said sump, a short circuiting path shunting said pump, a pressure operated switching valve in said short circuiting path, a pressure operated pilot valve for controlling said switching valve, a spur connection between said pilot valve and said exhaust conduit, and throttle means in said exhaust conduit downstream from said spur connection to create a pressure at said spur connection to cause concomitant opening of said pilot valve and said switching valve.

2. Hydraulic steering apparatus according to claim 1 wherein said switching valve is also a pressure relief valve for said short circuiting path.

\* \* \* \* \*